(12) United States Patent
Roe et al.

(10) Patent No.: US 11,196,449 B2
(45) Date of Patent: Dec. 7, 2021

(54) METHODS FOR CONFIGURING A MULTI-MODE ANTENNA SYSTEM FOR MULTI-CHANNEL COMMUNICATION SYSTEMS

(71) Applicant: AVX Antenna, Inc., San Diego, CA (US)

(72) Inventors: Michael Roe, San Diego, CA (US); Sebastian Rowson, San Diego, CA (US)

(73) Assignee: AVX Antenna, Inc., San Diego, CA (US)

( * ) Notice: Subject to any disclaimer, the term of this patent is extended or adjusted under 35 U.S.C. 154(b) by 0 days.

(21) Appl. No.: 16/522,160

(22) Filed: Jul. 25, 2019

(65) Prior Publication Data
US 2020/0052727 A1    Feb. 13, 2020

Related U.S. Application Data

(60) Provisional application No. 62/716,021, filed on Aug. 8, 2018.

(51) Int. Cl.
*H04B 1/00* (2006.01)
*H04B 1/18* (2006.01)
*H04B 17/309* (2015.01)

(52) U.S. Cl.
CPC .............. *H04B 1/0064* (2013.01); *H04B 1/18* (2013.01); *H04B 17/309* (2015.01)

(58) Field of Classification Search
CPC ....... H04B 1/0064; H04B 17/309; H04B 1/18
See application file for complete search history.

(56) References Cited

U.S. PATENT DOCUMENTS

| 5,159,707 A | 10/1992 | Mogi et al. |
| 5,313,660 A | 5/1994 | Lindenmeier et al. |
| 5,949,498 A | 9/1999 | Rudolph |

(Continued)

FOREIGN PATENT DOCUMENTS

KR    1020050080230    8/2005

OTHER PUBLICATIONS

International Search Report and Written Opinion for PCT/US2019/043425, dated Nov. 13, 2019, 13 pages.

(Continued)

*Primary Examiner* — Nguyen T Vo
(74) *Attorney, Agent, or Firm* — Dority & Manning, P.A.

(57) ABSTRACT

A method for configuring a multi-mode antenna system is provided. The method includes obtaining channel selection data indicating the antenna system is tuned to a first channel of a plurality of channels. The method includes configuring the antenna system in at least one operating mode of a plurality of operating modes, with each operating mode of the plurality of operating modes having a distinct radiation pattern. The method includes obtaining data indicative of a channel quality indicator for the at least one operating mode. The method includes determining a selected operating mode for the multi-mode antenna system for the first channel of the plurality of channels based, at least in part, on the data indicative of the channel quality indicator. The method includes configuring the antenna system in the selected operating mode when the multi-mode antenna system is tuned to the first channel.

15 Claims, 12 Drawing Sheets

(56) References Cited

U.S. PATENT DOCUMENTS

| | | | |
|---|---|---|---|
| 6,188,447 B1 | 2/2001 | Rudolph et al. | |
| 6,577,353 B1 | 6/2003 | Welles | |
| 7,034,898 B1 | 4/2006 | Zahm et al. | |
| 7,084,808 B2 | 8/2006 | Ratzel et al. | |
| 7,505,087 B2 | 3/2009 | Kang | |
| 7,676,202 B2 | 3/2010 | Anton-Becker | |
| 7,701,515 B2 | 4/2010 | Gomez et al. | |
| 7,936,852 B2 | 5/2011 | Lindenmeier | |
| 8,055,227 B2 | 11/2011 | Arroyo | |
| 8,060,910 B2 | 11/2011 | Cruz et al. | |
| 8,509,723 B2 | 8/2013 | Ghassemzadeh et al. | |
| 8,854,477 B2 * | 10/2014 | Asjadi | H04N 17/045 348/180 |
| 8,976,302 B2 | 3/2015 | Birkett et al. | |
| 9,369,755 B2 | 6/2016 | Gintis | |
| 9,425,497 B2 * | 8/2016 | Pajona | H04B 7/0689 |
| 9,479,837 B1 | 10/2016 | Rothaus et al. | |
| 2005/0257237 A1 * | 11/2005 | Yamamoto | H04N 21/44209 725/72 |
| 2006/0010473 A1 * | 1/2006 | Takagi | H04N 5/4401 725/72 |
| 2006/0020996 A1 * | 1/2006 | Takagi | H04N 21/44209 725/124 |
| 2006/0025097 A1 | 2/2006 | Zahm | |
| 2006/0139499 A1 * | 6/2006 | Onomatsu | H04N 21/6112 348/725 |
| 2006/0276149 A1 | 12/2006 | Womac et al. | |
| 2007/0004345 A1 | 1/2007 | Ono et al. | |
| 2008/0119150 A1 | 5/2008 | Su | |
| 2008/0232448 A1 * | 9/2008 | Baker | H03L 7/085 375/219 |
| 2009/0083821 A1 * | 3/2009 | Okamoto | H04N 21/6112 725/139 |
| 2010/0074351 A1 | 3/2010 | Ketchum et al. | |
| 2010/0117913 A1 | 5/2010 | Jung | |
| 2011/0179336 A1 | 7/2011 | Gesbert et al. | |
| 2013/0109327 A1 * | 5/2013 | Matsumori | H04W 88/06 455/73 |
| 2013/0135162 A1 | 5/2013 | Shamblin et al. | |
| 2014/0162566 A1 * | 6/2014 | Desclos | H04B 7/0871 455/67.13 |
| 2014/0376534 A1 * | 12/2014 | Pajona | H04W 24/02 370/338 |
| 2015/0280773 A1 * | 10/2015 | Chang | H01Q 3/24 455/78 |
| 2016/0316480 A1 * | 10/2016 | Oh | H04B 7/0695 |
| 2018/0084555 A1 * | 3/2018 | Mori | H04B 7/00 |
| 2018/0131990 A1 | 5/2018 | Desclos et al. | |
| 2018/0351253 A1 | 12/2018 | Shamblin et al. | |

OTHER PUBLICATIONS

International Search Report and Written Opinion for PCT/US2019, dated Nov. 8, 2019, 11 pages.

International Preliminary Report on Patentability for PCT/US2019/043417, dated Feb. 18, 2021, 8 pages.

International Preliminary Report on Patentability for PCT/US2019/043425 dated Feb. 18, 2021, 9 pages.

* cited by examiner

METHODS FOR CONFIGURING A MULTI-MODE ANTENNA SYSTEM FOR MULTI-CHANNEL COMMUNICATION SYSTEMS

PRIORITY CLAIM

The present application claims the benefit of priority of U.S. Provisional App. No. 62/716,021, titled "Methods for Configuring a Multi-Mode Antenna System for Multi-Channel Communication Systems," having a filing date of Aug. 8, 2018, which is incorporated by reference herein.

FIELD

The present disclosure relates generally to multi-mode antenna systems and, more specifically, to methods for configuring multi-mode antenna systems for use with multi-channel communication systems.

BACKGROUND

Multi-mode antennas can be used in various applications. For example, multi-mode antennas can be used in a smartphone to facilitate communication with other devices, such as other smartphones). As another example, multi-mode antennas can be used to receive over-the-air (OTA) signals and provide the OTA signals to one or more media devices (e.g., televisions). As yet another example, multi-mode antennas can be used to send and receive signals over a Wifi network.

SUMMARY

Aspects and advantages of embodiments of the present disclosure will be set forth in part in the following description, or may be learned from the description, or may be learned through practice of the embodiments.

In one example embodiment, a method for configuring a multi-mode antenna system is provided. The method includes obtaining, by a controller of the antenna system, channel selection data indicating the antenna system is tuned to a first channel of a plurality of channels. The method includes configuring, by the controller, the antenna system in at least one operating mode of a plurality of operating modes, with each operating mode of the plurality of operating modes having a distinct radiation pattern. The method includes obtaining, by the controller, data indicative of a channel quality indicator for the at least one operating mode. The method includes determining, by the controller, a selected operating mode for the multi-mode antenna system for the first channel of the plurality of channels based, at least in part, on the data indicative of the channel quality indicator. The method includes configuring, by the controller, the antenna system in the selected operating mode when the multi-mode antenna system is tuned to the first channel.

In another example embodiment, a method for configuring a multi-mode antenna system is provided. The method includes configuring, by a controller, the multi-mode antenna system in each operating mode of a plurality of operating modes. Each operating mode can have a distinct radiation pattern. The method further includes obtaining, by the controller, data indicative of a channel quality indicator for each operating mode of the plurality of operating modes. In addition, the method includes determining, by the controller, configuration data for the multi-mode antenna system for each channel of a plurality of channels based, at least in part, on the data indicative of the channel quality indicator. The configuration data can link each channel of the plurality of channels to a corresponding operation mode of the plurality of operating modes. Furthermore, the method includes obtaining, by the controller, channel selection data indicating the multi-mode antenna system is tuned to a first channel of the plurality of channels. In addition, the method includes determining, by the controller, a selected operating mode for the multi-mode antenna system for the first channel based, at least in part, on the channel selection data and the configuration data. Furthermore, the method includes configuring, by the controller, the multi-mode antenna system in the selected operating mode.

In yet another example embodiment, a multi-mode antenna system is provided. The multi-mode antenna system includes a plurality of antenna elements. Each antenna element is associated with an independent feed element. Each antenna element is configured to receive one or more radio frequency signals. The multi-mode antenna system further includes at least two receives. Each receiver of the at least two receivers is tunable to each of a plurality of frequency channels. The multi-mode antenna system further includes a controller configured to perform operations. The operations include configuring the multi-mode antenna system in each operating mode of a plurality of operating modes, each operating mode having a distinct radiation pattern. In addition, the operations include obtaining data indicative of a channel quality indicator for each operating mode. The operations further include determining configuration data for the multi-mode antenna system for each channel of a plurality of channels based, at least in part, on the data indicative of the channel quality indicator. The configuration data links each channel of the plurality of channels to a corresponding operating mode of the plurality of operating modes. The operations further include obtaining, by the controller, channel selection data indicating a first receiver of the at least two receivers is tuned to a first channel of the plurality of channels. In addition, the operations include determining, by the controller, a selected operating mode for the multi-mode antenna system for the first channel based, at least in part, on the channel selection data and the configuration data. Furthermore, the operations include configuring, by the controller, the multi-mode antenna system in the selected operating mode.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
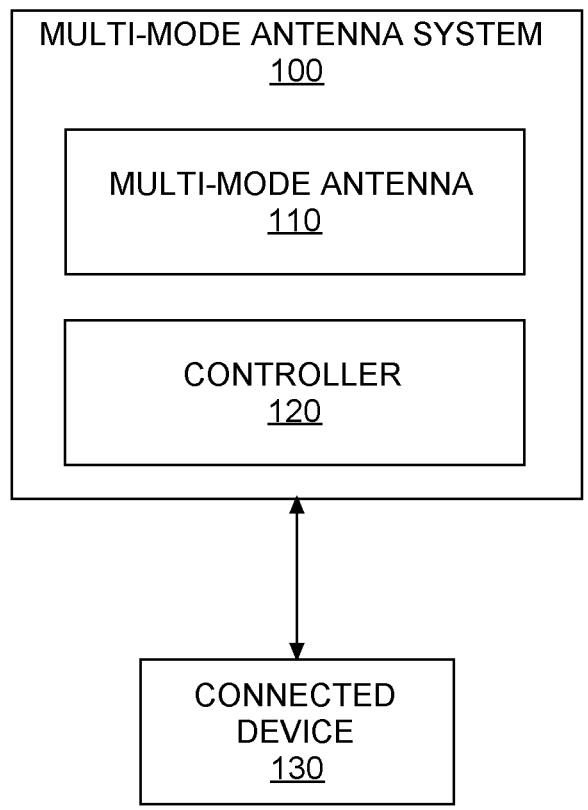
FIG. 1 depicts an example embodiment of a multi-mode antenna system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to methods for configuring a multi-mode antenna system for use with a multi-channel communication system implementing any suitable protocol (e.g., UHF, VHF, Wifi, cellular, etc.). The multi-mode antenna system can include an antenna and a controller. The antenna can include one or more antenna elements. The controller can be configured to implement methods for configuring the multi-mode antenna system in one of a plurality of operating modes, with each operating mode of the plurality of operating modes having a distinct radiation pattern.

In some implementations, a method for configuring the antenna system includes obtaining channel selection data indicating the antenna system is tuned to a first frequency channel of a plurality of frequency channels. The method can include configuring the antenna system in at least one of the plurality of operating modes. The method can include obtaining data indicative of a channel quality indicator for the at least one operating mode. The method can include determining a selected operating mode for the antenna system for the first channel based, at least in part, on the data indicative of the channel quality indicator for the at least one operating mode. The method can include configuring the antenna system in the selected operating mode.

In some implementations, a method for configuring the antenna system can include configuring the antenna system in each operating mode of the plurality of operating modes. The method can include obtaining data indicative of a channel quality indicator for each operating mode. The method can include determining configuration data for the antenna system based, at least in part, on the data indicative of the channel quality indicator. The configuration data can link each frequency channel of the plurality of frequency channels with an operating mode of the plurality of operating modes. For instance, the first frequency channel may be linked with a first operating mode, whereas a second frequency channel may be linked with a different operating mode, such as a second or third operating mode. The configuration data can be stored in memory associated with the controller. The method can include obtaining channel selection data indicating the antenna system is tuned to the first frequency channel. The method can include determining a selected operating mode for the antenna system based, at least in part, on the configuration data and the channel selection data. The method can include configuring the antenna system in the selected operating mode.

As used in the specification and the appended claims, the terms "first" and "second" may be used interchangeably to distinguish one component from another and are not intended to signify location or importance of the individual components. The singular forms "a", "an", and "the" include plural references unless the context clearly dictates otherwise. The use of the term "about" in conjunction with a numerical value is intended to refer to within ten percent (10%) of the stated numerical value. As used herein, a "multi-mode antenna" refers to an antenna capable of operating in a plurality of modes wherein each mode is associated with a distinct radiation pattern. As used herein, a "receiver" refers to a receiver capable of being selectively tuned to one of a plurality of frequency channels. Additionally, the "receiver" refers to a receiver capable of obtaining one or more metrics while tuned to one of the plurality of frequency channels. In some embodiments, the "receiver" includes an analog front end comprising a RF analog power detector and a plurality of filters. Additionally, in some embodiments, the "receiver" can include a digital back-end comprising a demodulator. It should be appreciated that the digital back end can be in communication with the analog front end via an analog-to-digital converter. It should be appreciated that, in some embodiments, the receiver may not include the demodulator. For instance, the antenna system may not include a demodulator. Alternatively, the demodulator may be a separate component of the antenna system.

Referring now to FIG. 1, a block diagram of a multi-mode antenna system 100 is provided according to example embodiments of the present disclosure. As shown, the multi-mode antenna system 100 can include a multi-mode antenna 110. It should be appreciated that the multi-mode antenna system 100 can be configured to receive radio frequency (RF) signals within any suitable frequency band.

Figure 2:
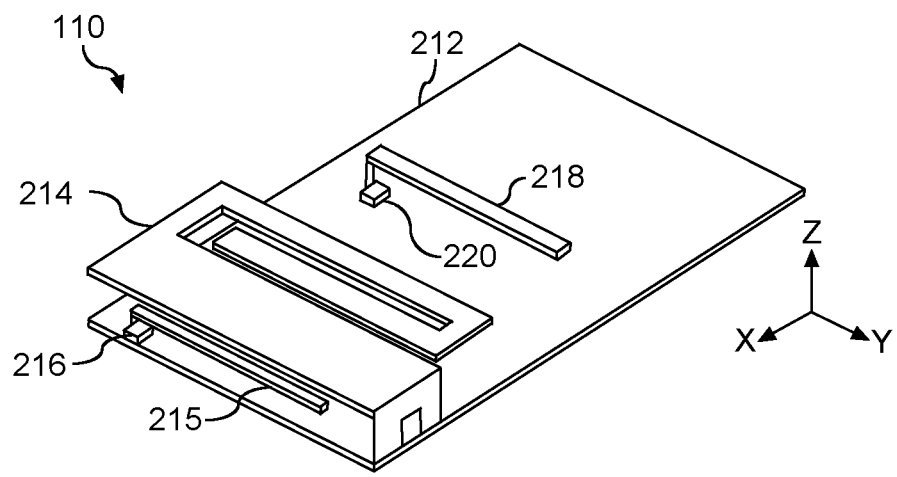
FIG. 2 depicts a multi-mode antenna according to example embodiments of the present disclosure.

The multi-mode antenna system 100 can further include a controller 120. As will be discussed below in more detail, the controller 120 can implement various operations (e.g., processes) to configure the multi-mode antenna system 100 for use with a connected device 130. Examples of the connected device 130 can include, without limitation, a media device (e.g., television), a set-top box, a smartphone, or any other suitable computing device. FIG. 2 illustrates an example embodiment of the multi-mode antenna 110 according to example embodiments of the present disclosure. The multi-mode antenna 110 can include a circuit board 212 (e.g., including a ground plane) and a driven antenna element 214 disposed on the circuit board 212. An antenna volume may be defined between the circuit board 212 (e.g., and the ground plane) and the driven antenna element 214. As shown, the multi-mode antenna 110 can include a first parasitic element 215 positioned at least partially within the antenna volume. The multi-mode antenna 110 can further include a first tuning element 216 coupled with the first parasitic element 215. The first tuning element 216 can be a passive or active component or series of components and can be configured to alter a reactance on the first parasitic element 215 either by way of a variable reactance or shorting to ground. It should be appreciated that altering the reactance of the first parasitic element 215 results in a frequency shift of the antenna. It should also be appreciated that the first tuning element 216 can include at least one of a tunable capacitor, MEMS device, tunable inductor, switch, a tunable phase shifter, a field-effect transistor, or a diode.

In example embodiments, the multi-mode antenna 110 can include a second parasitic element 218 disposed adjacent the driven antenna element 214 and outside of the antenna volume. The multi-mode antenna 110 can further include a second tuning element 220. In example embodiments, the second tuning element 220 can be a passive or active component or series of components and may be configured to alter a reactance on the second parasitic element 218 by way of a variable reactance or shorting to ground. It should be appreciated that altering the reactance of the second parasitic element 218 result in a frequency shift of the antenna. It should also be appreciated that the second tuning element 220 can include at least one of a tunable capacitor, MEMS device, tunable inductor, switch, a tunable phase shifter, a field-effect transistor, or a diode.

In example embodiments, operation of the first tuning element 216 and/or the second tuning element 220 can shift the radiation pattern characteristics of the driven antenna element 214 by varying a reactance thereof. Shifting the antenna radiation pattern can be referred to as "beam steering". However, in instances where the antenna radiation pattern includes a null, a similar operation, commonly referred to as "null steering", can be performed to shift the null to an alternative position about the antenna element 214 (e.g., to reduce interference).

Figure 3:
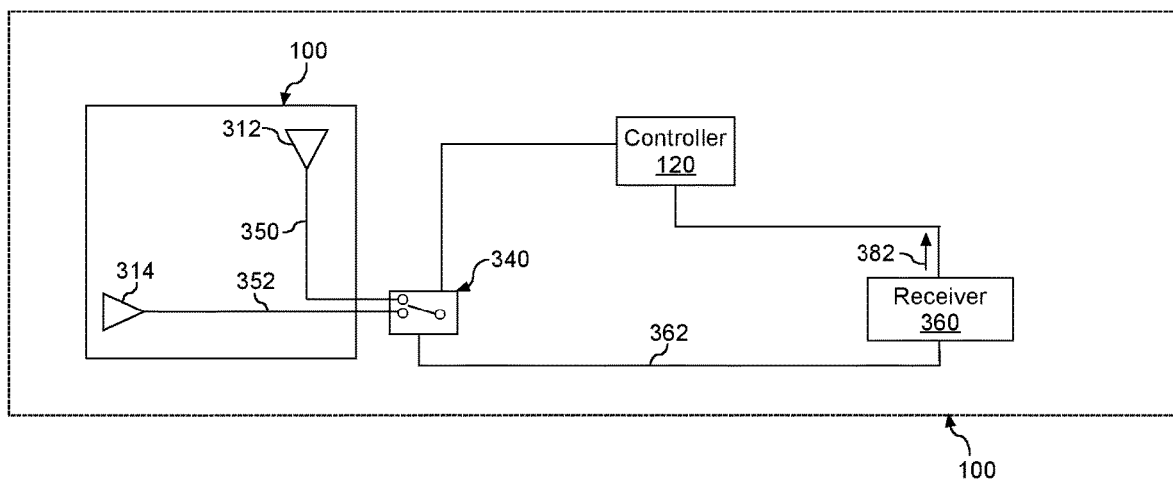
FIG. 3 depicts an example embodiment of a multi-mode antenna system according to example embodiments of the present disclosure.

Referring now to FIG. 3, an example embodiment of the multi-mode antenna system 100 is provided. As shown, the multi-mode antenna 110 of the multi-mode antenna system 100 can include a first antenna element 312 and a second antenna element 314. It should be appreciated, however, that the multi-mode antenna 110 can include more or fewer antenna elements. In some embodiments, the first antenna element 312 and the second antenna element 314 can each have a fixed radiation pattern and/or polarization. For example, an antenna polarization of the first antenna element 312 can be different than an antenna polarization of the second antenna element 314. For instance, the first antenna element 312 can have a horizontal polarization, whereas the second antenna element 314 can have a vertical polarization. It should be appreciated, however, that the first antenna element 312 and the second antenna element 314 can have any suitable antenna polarization. It should also be appreciated that the first antenna element 312 and the second antenna element 314 can each be associated with an independent RF feed. For instance, the first antenna element 312 can be associated with a first RF feed, whereas the second antenna element 314 can be associated with a second RF feed that is different than the first RF feed.

As shown, the multi-mode antenna system 100 can include a switching device 340 coupled to the first antenna element 312 and the second antenna element 314 via conductors 350 and 352, respectively. Additionally, the switching device 340 can be coupled to a receiver 360 of the multi-mode antenna system 100 via one or more conductors 362. As will be discussed below, the switching device 340 can be configurable in at least two different states to configure the multi-mode antenna system 100 in a first operating mode or a second operating mode.

When the multi-mode antenna system 100 is configured in the first operating mode, the switching device 340 couples the first antenna element 312 to the receiver 360. In contrast, when the multi-mode antenna system 100 is configured in the second operating mode, the switching device 340 couples the second antenna element 314 to the receiver 360. Furthermore, since the polarization of the first antenna element 312 is different than the polarization of the second antenna element 314, it should be appreciated that the radiation pattern associated with the first operating mode is different than the radiation pattern associated with the second operating mode.

In example embodiments, the receiver 360 can be tuned to any one of a plurality of different frequency channels. For instance, when the receiver 360 is coupled to the first antenna element 312 and tuned to a first frequency channel of the plurality of frequency channels, the receiver 360 can be configured to process one or more RF signals received at the first antenna element 312 and corresponding to the first frequency channel. In this manner, the receiver 360 can process the one or more RF signals received at the first antenna element 312 to obtain data indicative of a channel quality indicator (CQI) for the first operating mode of the multi-mode antenna system 100. In contrast, when the receiver 360 is coupled to the second antenna element 314 and tuned to the first frequency channel, the receiver 360 can be configured to process one or more RF signals received at the second antenna element 314 and corresponding to the first frequency channel. In this manner, the receiver 360 can process the one or more RF signals received at the second antenna element 314 to obtain data indicative of a channel quality indicator for the second operating mode of the multi-mode antenna system 100. It should be appreciated that examples of data indicative of the CQI can include at least one of a received signal strength indicator (RSSI), a signal to noise ratio (SNR), a signal to interference plus noise ratio (SNIR), a magnitude error ratio (MER), an error vector magnitude (EVM), a bit error rate (BER), a block error rate (BLER), and a packet error rate (PER).

In example embodiments, the receiver 360 can include an analog front end (not shown) configured to process the one or more RF signals. The analog front end can include a RF analog power detector and a plurality of filters. In example embodiments, the receiver 360, specifically the analog front end thereof, can obtain a RSSI measurement based, at least in part, on the one or more RF signals.

Additionally, in some embodiments, the receiver 360 can include a digital back end. The digital back end can be in communication with the analog front end via an analog-to-digital (A/D) converter. The A/D converter can be configured to receive analog signals from the analog front end, convert the analog signals into digital signals, and provide the digital signals to the digital back end. In example embodiments, the digital back end can include a demodulator. The demodulator can be configured to demodulate the digital signals received from the A/D converter. In example embodiments, data indicative of the performance of the current operating mode of the antenna system can be obtained based, at least in part, on the demodulated signals output by the demodulator. More specifically, the data indicative of the performance of the current operating mode can include, without limitation, at least one of SNR, SINR, EVN, MER, EVM, BER, BLER, and PER.

As shown, the controller 120 can be in communication with the receiver 360. In this manner, the controller 120 can receive one or more signals 382 from the receiver 360. In example embodiments, the one or more signals 382 can include data indicative of the channel quality indicator for the first operating mode or the second operating mode. For instance, the one or more signals 382 can include the RSSI measurement obtained based, at least in part, on the RF signal(s) processed via the analog front end of the receiver 360. Alternatively and/or additionally, the one or more signals 382 can include data (e.g., SNR, SINR, EVN MER, EVM, BER, BLER, PER) obtained based, at least in part, on the demodulated signal(s) output via the digital back end of the receiver 360.

In example embodiments, the controller 120 can be in communication with the switching device 340. In this manner, the controller 120 can control operation of the switching device 340 to configure the multi-mode antenna system 100 in the first operating mode or the second operating mode. As will be discussed below in more detail, the controller 120 can be configured to implement any of the processes discussed above with reference to FIGS. 6 through 11 to determine a selected operating mode for the multi-mode antenna system 100 and configure the multi-mode antenna system 100 in the selected operating mode.

Figure 4:
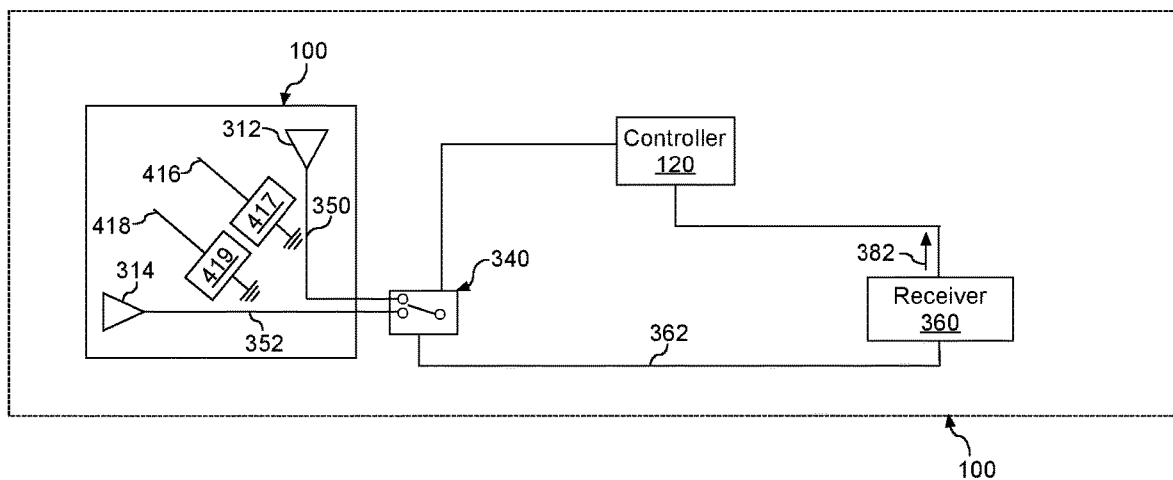
FIG. 4 depicts an example embodiment of a multi-mode antenna system according to example embodiments of the present disclosure.

Referring now to FIG. 4, another example embodiment of the multi-mode antenna system 100 is provided according to example embodiments of the present disclosure. The multi-mode antenna system 100 is configured in substantially the same manner as the multi-mode antenna system 100 of FIG. 3. However, in contrast to the multi-mode antenna system 100 of FIG. 3, the multi-mode antenna system 100 of FIG. 4 includes a first parasitic element 416 and a second parasitic element 418. As shown, the first parasitic element 416 can be positioned adjacent the first antenna element 312 and coupled to ground GND via a first shunt switch 417. The second parasitic element 418 can be positioned adjacent the second antenna element 314 and coupled to GND via a second shunt switch 419. In example embodiments, the first parasitic element 416 can be configured to modify (e.g., adjust) the radiation pattern associated with the first antenna element 312. In this manner, the radiation pattern associated with the first antenna element 312 can be modified via the first parasitic element 416 to obtain a third operating mode of the multi-mode antenna system 100. Additionally, the second parasitic element 418 can modify the radiation pattern associate with the second antenna element 314. In this manner, the radiation pattern associated with the second antenna element 314 can be modified via the second parasitic element 418 to obtain a fourth operating mode of the multi-mode antenna system 100. It should be appreciated that the first, second, third, and fourth operating modes of the multi-mode antenna system 100 can each have a distinct radiation pattern. It should also be appreciated that the first parasitic element 416 and the second parasitic element 418 can each be configured to provide any suitable number of operating modes beyond the first operating mode and the second operating mode discussed above with reference to FIG. 3.

Figure 5:
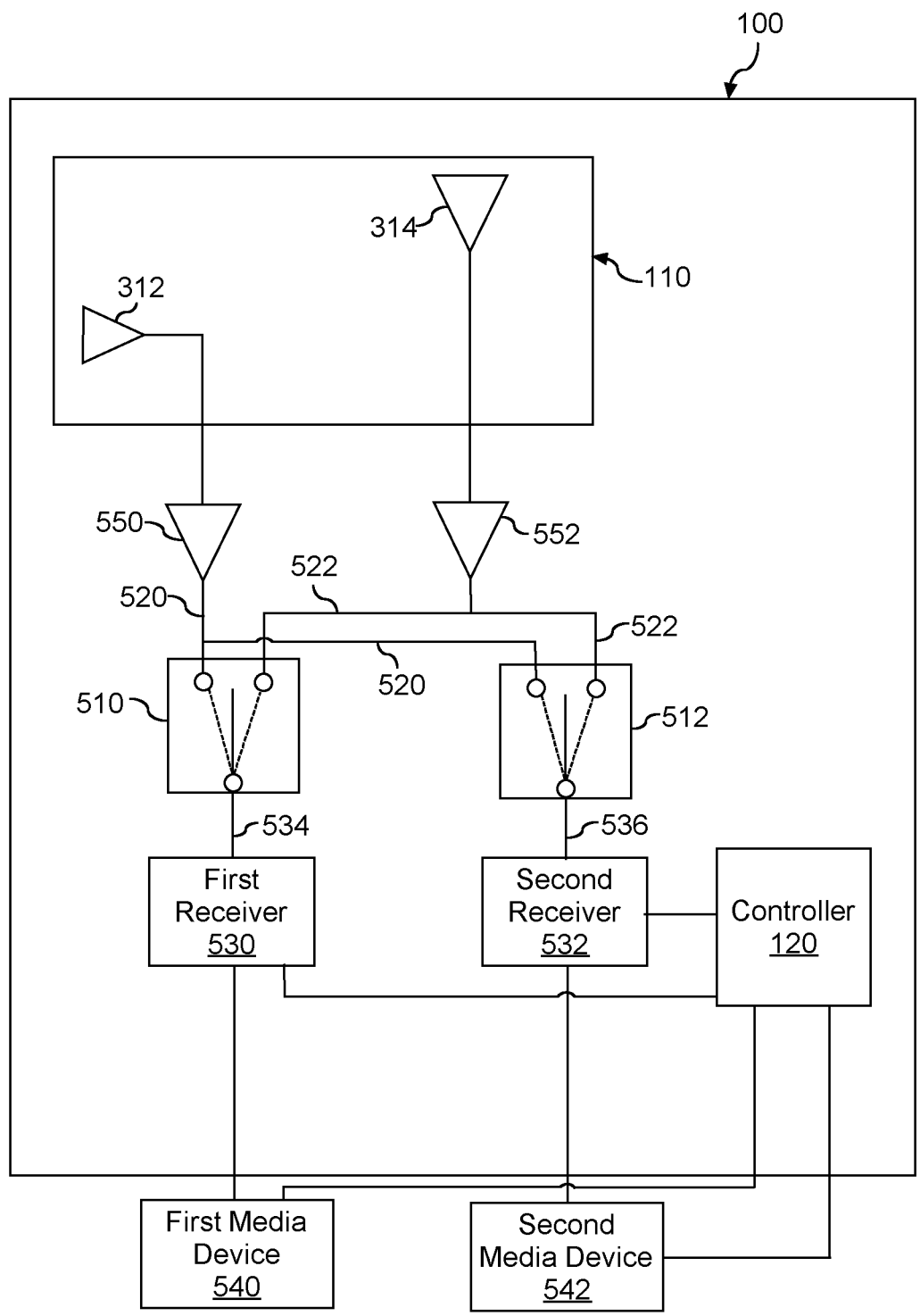
FIG. 5 depicts an example embodiment of a multi-mode antenna system according to example embodiments of the present disclosure.

Referring now to FIG. 5, yet another example embodiment of the multi-mode antenna system 100 is provided according to the present disclosure. As shown, the multi-mode antenna system 100 can include a first switching device 510 and a second switching device 512. It should be appreciated, however, that the multi-mode antenna system 100 can include more or fewer switching devices. As shown, the first switching device 510 can be coupled to the first antenna element 312 and the second antenna element 314 via a first conductor 520 and a second conductor 522, respectively. Additionally, the second switching device 512 can be coupled to the first antenna element 312 and the second antenna element 314 via the first conductor 520 and the second conductors 522, respectively.

In example embodiments, the multi-mode antenna system 100 can include a first receiver 530 and a second receiver 532. It should be appreciated, however, that the multi-mode antenna system 100 can include more or fewer receivers. It should also be appreciated that the first receiver 530 and the second receiver 532 can be configured in substantially the same manner as the receiver 360 (FIG. 3) discussed above with reference to FIG. 3. For instance, in some embodiments, the first receiver 530 and the second receiver 532 can each include an analog front end. In alternative implementations, the first receiver 530 and the second receiver 532 can each include the analog front end and a digital back end. More specifically, the digital back end can be in communication with the analog front end via an A/D converter.

In some implementations, the first receiver 530 and the second receiver 532 can be disposed on the same printed circuit board. In alternative implementations, the first receiver 530 and the second receiver 532 can be disposed on separate printed circuit boards. As shown, the first receiver 530 can be coupled to the first switching device 510 via a third conductor 534. Additionally, the second receiver 532 can be coupled to the second switching device 512 via a fourth conductor 536.

The first receiver 530 can be selectively coupled to one of the first antenna element 312 and the second antenna element 314 via the first switching device 510. Additionally, the second receiver 532 can be selectively coupled to one of the first antenna element 312 and the second antenna element 314 via the second switching device 512. In example embodiments, the first receiver 530 is couplable to a first media device 540 (e.g., television) via any suitable wired or wireless communication link. Additionally, the second receiver 532 is couplable to a second media device 542 (e.g., television) via any suitable wired or wireless communication link. In this manner, content (e.g., local programming) associated with RF signals received at one of the first antenna element 312 and the second antenna element 314 can be provided to the first media device 540 (e.g., via the first receiver 530) and the second media device 542 (e.g., via the second receiver 532).

When the first switching device 510 is configured in a first state, the first receiver 530 is coupled to the first antenna element 312. In this manner, RF signals received at the first antenna element 312 can be provided to the first receiver 530 via the first switching device 510. In contrast, when the first switching device 510 is configured in a second state, the first receiver 530 can be coupled to the second antenna element 314. In this manner, the plurality of RF signals received at the second antenna element 314 can be provided to the first receiver 530 via the first switching device 510.

In some implementations, the first receiver 530 can be to one of a plurality of frequency channels. For instance, the first receiver 530 can be tuned to a first frequency channel of the plurality of frequency channels. In this manner, the first receiver 530 can process one or more RF signals corresponding to the first frequency channel to obtain data indicative of a channel quality indicator for one of the operating modes of the multi-mode antenna system 100. For instance, if the first receiver 530 is coupled to the first antenna element 312 via the first switching device 510, the first receiver 530 can obtain data indicative of a channel quality indicator for the first operating mode of the multi-mode antenna system 100. Alternatively, if the first receiver 530 is coupled to the second antenna element 314 via the first switching device 510, the first receiver 530 can obtain data indicative of a channel quality indicator for the second operating mode of the multi-mode antenna system 100. Examples of the one or more metrics can include, without limitation, RSSI, SNR, SINR, MER, EVM, BER, BLER, and PER.

When the second switching device 512 is configured in a first state, the second receiver 532 can be coupled to the first antenna element 312. In this manner, the plurality of RF signals received at the first antenna element 312 can be provided to the second receiver 532 via the second switching device 512. When the second switching device 512 is configured in a second state, the second receiver 532 can be coupled to the second antenna element 314. In this manner, the plurality of RF signals received at the second antenna element 314 can be provided to the second receiver 532 via the second switching device 512.

In some implementations, the second receiver 532 can be tuned to one of the plurality of different frequency channels. For instance, the second receiver 532 can be tuned to a second frequency channel of the plurality of frequency channels. In this manner, the second receiver 532 can process one or more RF signals corresponding to the second channel to obtain data indicative of a channel quality indicator for one of the operating modes of the multi-mode antenna system 100. For instance, if the second receiver 532 is coupled to the first antenna element 312 via the second switching device 512, the second receiver 532 can obtain data indicative of a channel quality indicator for the first operating mode of the multi-mode antenna system 100. Alternatively, if the second receiver 532 is coupled to the second antenna element 314 via the second switching device 512, the second receiver 532 can obtain data indicative of a channel quality indicator for the second operating mode of the multi-mode antenna system 100.

In example embodiments, the multi-mode antenna system 100 can include a first low noise amplifier 550 and a second low noise amplifier 552. It should be appreciated, that the multi-mode antenna system 100 can include more or fewer low noise amplifiers. As shown, the first low noise amplifier 550 can be coupled between the switching devices 510, 512 and the antenna element 312, 314. In this manner, the first low noise amplifier 550 can amplify RF signals received at the first antenna element 312 and the second antenna element 314, respectively. Additionally, the second low noise amplifier 552 can be coupled between the switching devices 510, 512 and the antenna elements 312, 314. In this manner, the second low noise amplifier 552 can amplify RF signals received at the first antenna element 312 and second antenna element 314, respectively.

Figure 6:
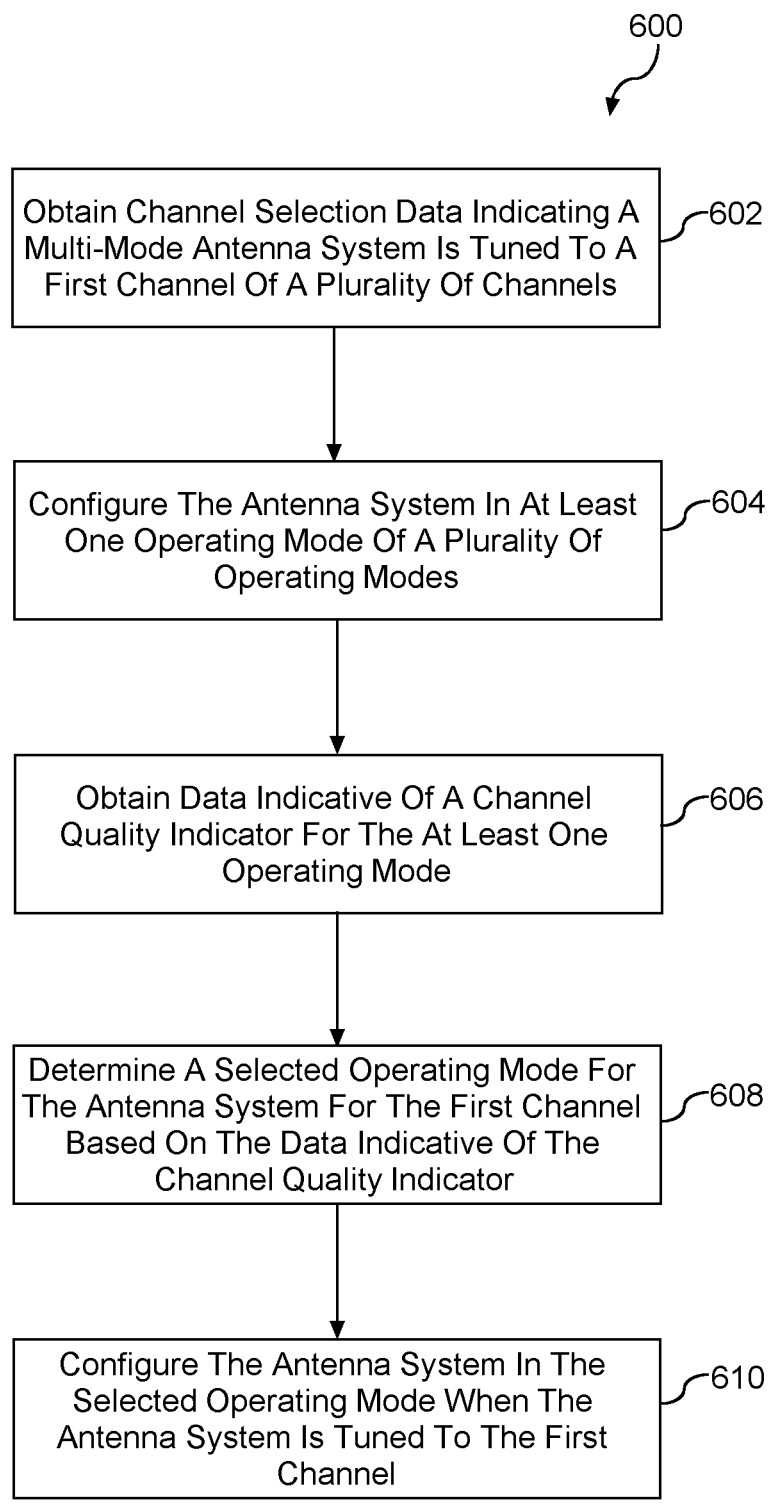
FIG. 6 depicts a flow diagram of a method for configuring a multi-mode antenna system according to example embodiments of the present disclosure.

Referring now to FIG. 6, a flow diagram of a method 600 for configuring a multi-mode antenna system is provided according to example embodiments of the present disclosure. It should be appreciated that the method 600 can be implemented by the controller 120 (FIG. 1) of the multi-mode antenna system 100 (FIG. 1). FIG. 6 depicts steps performed in a particular order for purposes of illustration and discussion. Those of ordinary skill in the art, using the disclosures provided herein, will understand that various steps of the method 600 may be adapted, modified, rearranged, performed simultaneously or modified in various ways without deviating from the scope of the present disclosure.

At (602), the method 600 includes obtaining channel selection data indicating the multi-mode antenna system is tuned to a first channel of a plurality of channels. For example, the controller can obtain the channel selection data from a receiver of the antenna system. At (604), the method 600 includes configuring the multi-mode antenna system in at least one operating mode of a plurality of operating modes. In example embodiments, each operating mode of the plurality of operating modes can have a distinct radiation pattern.

At (606), the method 600 includes obtaining data indicative of a channel quality indicator for the at least one operating mode. In example embodiments, data indicative of the channel quality indicator can include at least one of RSSI, SNR, SNIR, MER, EVM, BER, a BLER, and PER.

At (608), the method 600 includes determining a selected operating mode for the multi-mode antenna system for the first channel of the plurality of channels based, at least in part, on the data obtained at (606). At (610), the method 600 includes configuring the multi-mode antenna system in the selected operating mode when the multi-mode antenna system is tuned to the first channel of the plurality of channels.

Figure 7:
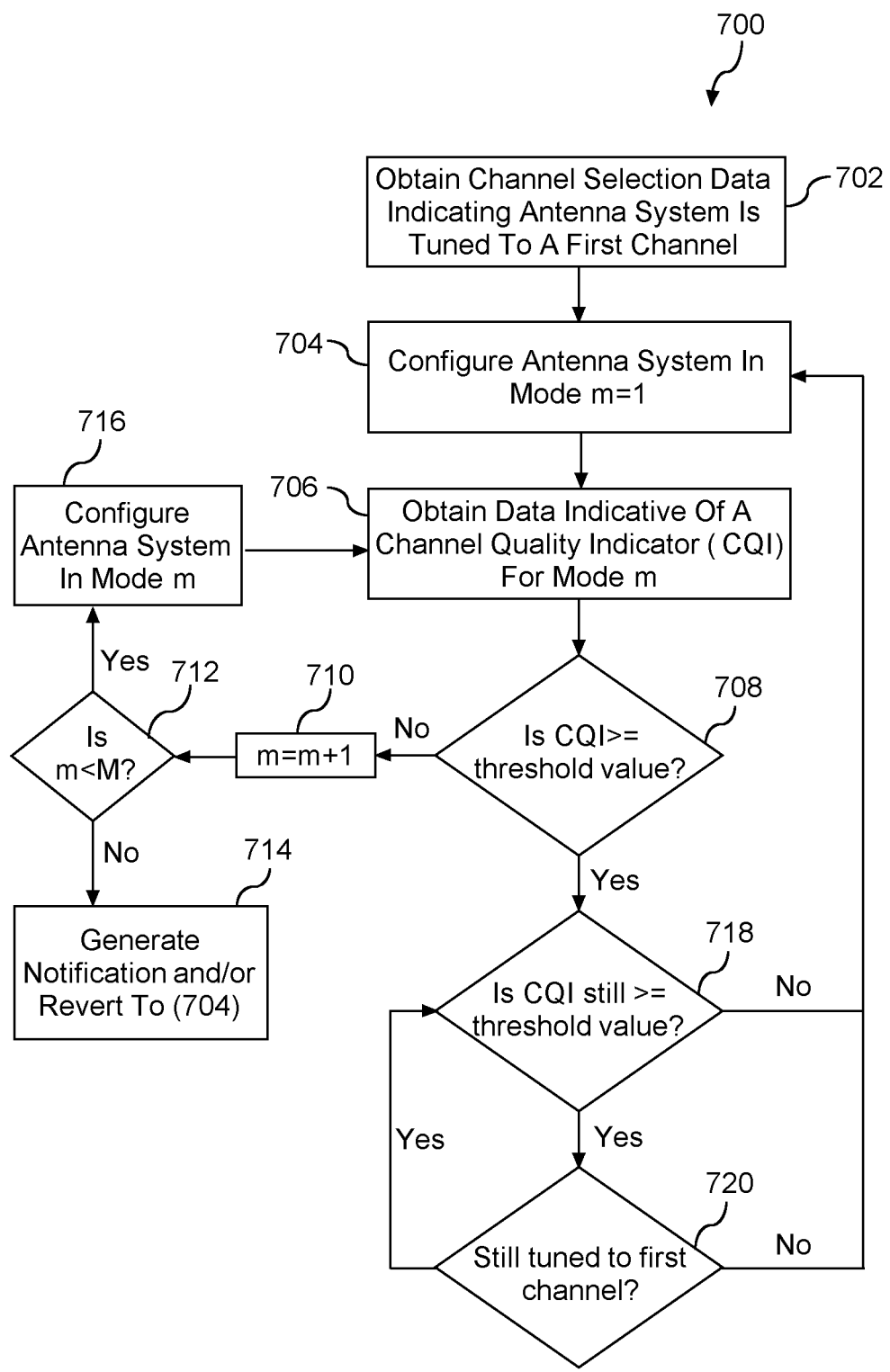
FIG. 7 depicts a flow diagram of a method for configuring a multi-mode antenna system according to example embodiments of the present disclosure.

Referring now to FIG. 7, a flow diagram of a method 700 for configuring a multi-mode antenna system is provided according to example embodiments of the present disclosure. It should be appreciated that the method 700 can be implemented by a controller of the multi-mode antenna system. FIG. 7 depicts steps performed in a particular order for purposes of illustration and discussion. Those of ordinary skill in the art, using the disclosures provided herein, will understand that various steps of the method 700 may be adapted, modified, rearranged, performed simultaneously or modified in various ways without deviating from the scope of the present disclosure.

At (702), the method 700 includes obtaining channel selection data indicating the multi-mode antenna system is tuned to a first channel of a plurality of channels. Additionally, a channel counter variable, n, is assigned a numerical value of 1. At (704), the method 700 includes configuring the multi-mode antenna system in a first operating mode of a plurality of operating modes. Additionally, a mode counter variable, m, can be assigned a numerical value of 1.

At (706), the method 700 includes obtaining data indicative of a channel quality indicator (CQI) for mode m. In example embodiments, the data indicative of the CQI can include at least one of RSSI, SNR, SINR, MER, EVM, BER, BLER, and PER. After obtaining data indicative of the CQI for mode m, the method 700 proceeds to (708).

At (708), the method 700 includes determining whether the CQI for mode m is below a threshold value. In example embodiments, the multi-mode antenna system can be configured for use with one or more media devices (e.g., television), and the threshold value can correspond to a value needed to view content (e.g., local news) associated with the first channel of the plurality of channels. More specifically, the threshold value can correspond to a predetermined value based, at least in part, on the data indicative of the CQI. For example if the data indicative of the CQI includes SNR, the threshold value can correspond to a predetermined value based, at least in part, on the SNR. If the CQI for mode m is below the threshold value, the method 700 proceeds to (710). Otherwise, the method 700 proceeds to (718).

At (710), the method 700 includes incrementing the mode counter variable, m. Once the mode counter variable has been incremented, the method 700 proceeds to (712). At (712), the method 700 includes determining whether the present value of the mode counter variable, m, is less than the total number of operating modes, M, in which the multi-mode antenna system can be configured. If the present value of the mode counter variable, m, is equal to the M, the method proceeds to (714). Otherwise, the method 700 proceeds (716).

At (714), the method 700 includes generating notification. In example embodiments, the notification can indicate that none of the plurality of operating modes are optimal or near optimal when the multi-mode antenna system is tuned to the first channel. Additionally and/or alternatively, the method 700 can revert to (704).

At (716), the method 700 includes reconfiguring the antenna system based, at least in part, on the present value of the mode counter variable, m. After reconfiguring the antenna system at (716), the method reverts to (706). It should be appreciated that, in some implementations, multiple iterations of steps (706), (708), (710), (712), and (716) may be performed before determining the CQI for one of the plurality of operating modes equals or exceeds the threshold value.

At (718), the method 700 includes redetermining whether the CQI of the selected operating mode for the multi-mode antenna system is greater than or equal to the threshold value. If the CQI of the selected operating mode is now below the threshold value, the method 700 reverts to (704). Otherwise the method 700 proceeds to (720).

At (720), the method 700 includes determining whether the multi-mode antenna system is still tuned to the first channel. If the multi-mode antenna system is still tuned to the first channel, the multi-mode antenna system remains configured in the selected operating mode and the method 700 reverts to (718). If, however, the multi-mode antenna system is no longer tuned to the first channel, the method 700 reverts to (704).

Figure 8:
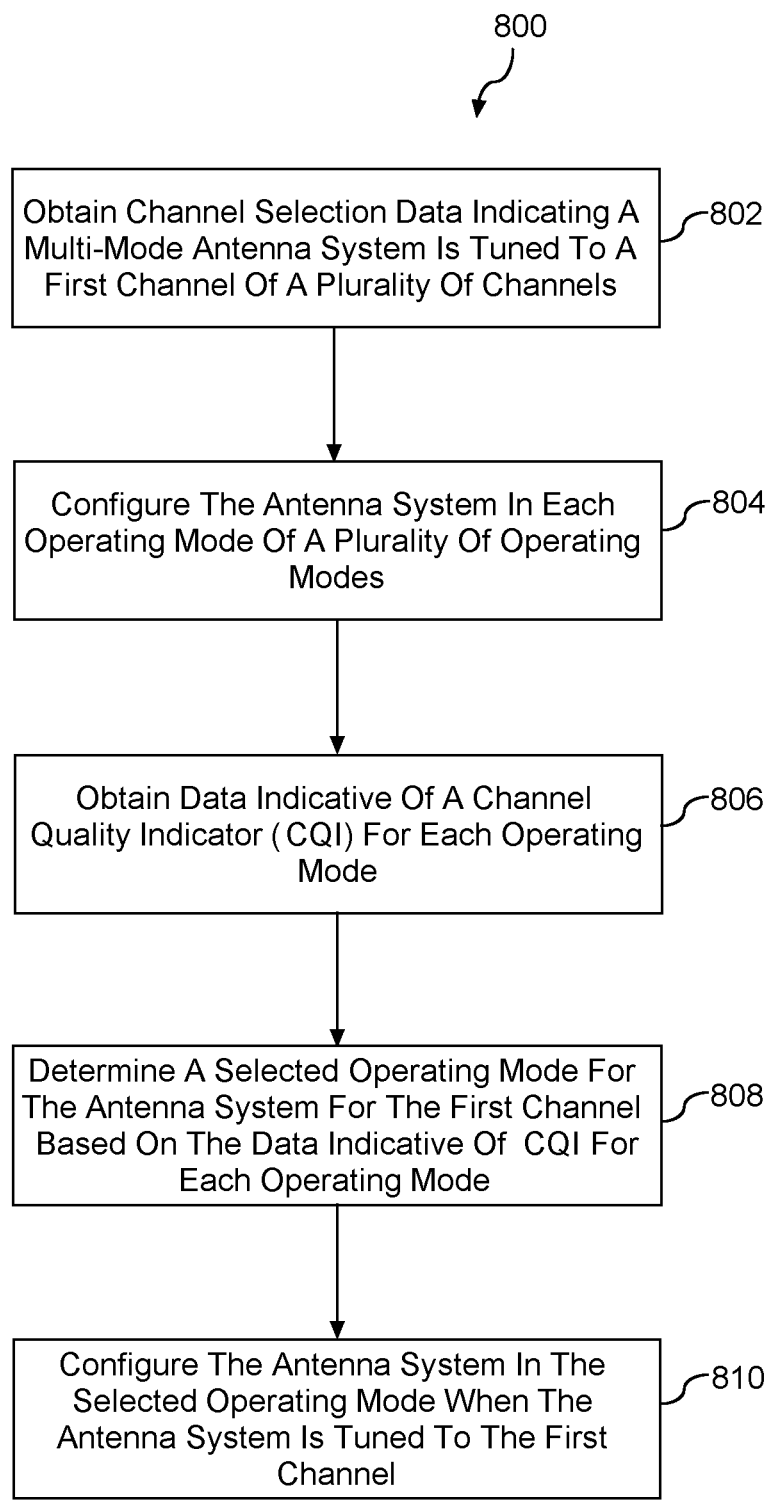
FIG. 8 depicts a flow diagram of a method for configuring a multi-mode antenna system according to example embodiments of the present disclosure.

Referring now to FIG. 8, a flow diagram of a method 800 for configuring a multi-mode antenna system is provided according to example embodiments of the present disclosure. It should be appreciated that the method 800 can be implemented by the controller 120 (FIG. 1) of the multi-mode antenna system 100 (FIG. 1). FIG. 8 depicts steps performed in a particular order for purposes of illustration and discussion. Those of ordinary skill in the art, using the disclosures provided herein, will understand that various steps of the method 800 may be adapted, modified, rearranged, performed simultaneously or modified in various ways without deviating from the scope of the present disclosure.

At (802), the method 800 includes obtaining channel selection data indicating the multi-mode antenna system is tuned to a first channel of a plurality of channels. In example embodiments, the channel selection data can be obtained from a receiver of the antenna system that is tuned to the first frequency channel. At (804), the method 800 includes configuring the multi-mode antenna system in each operating mode of a plurality of operating modes. In example embodiments, each operating mode of the plurality of operating modes can have a distinct radiation pattern.

At (806), the method 800 includes obtaining data indicative of a channel quality indicator for each operating mode.

In example embodiments, the data indicative of the channel quality indicator can include at least one of RSSI, SNR, SNIR, MER, EVM, BER, BLER, and PER.

At (808), the method 800 includes determining a selected operating mode for the antenna system for the first channel based, at least in part, on the data indicative of the channel quality indicator for each operating mode. At (810), the method 800 includes configuring the multi-mode antenna system in the selected operating mode when the multi-mode antenna system is tuned to the first channel of the plurality of channels.

Figure 9:
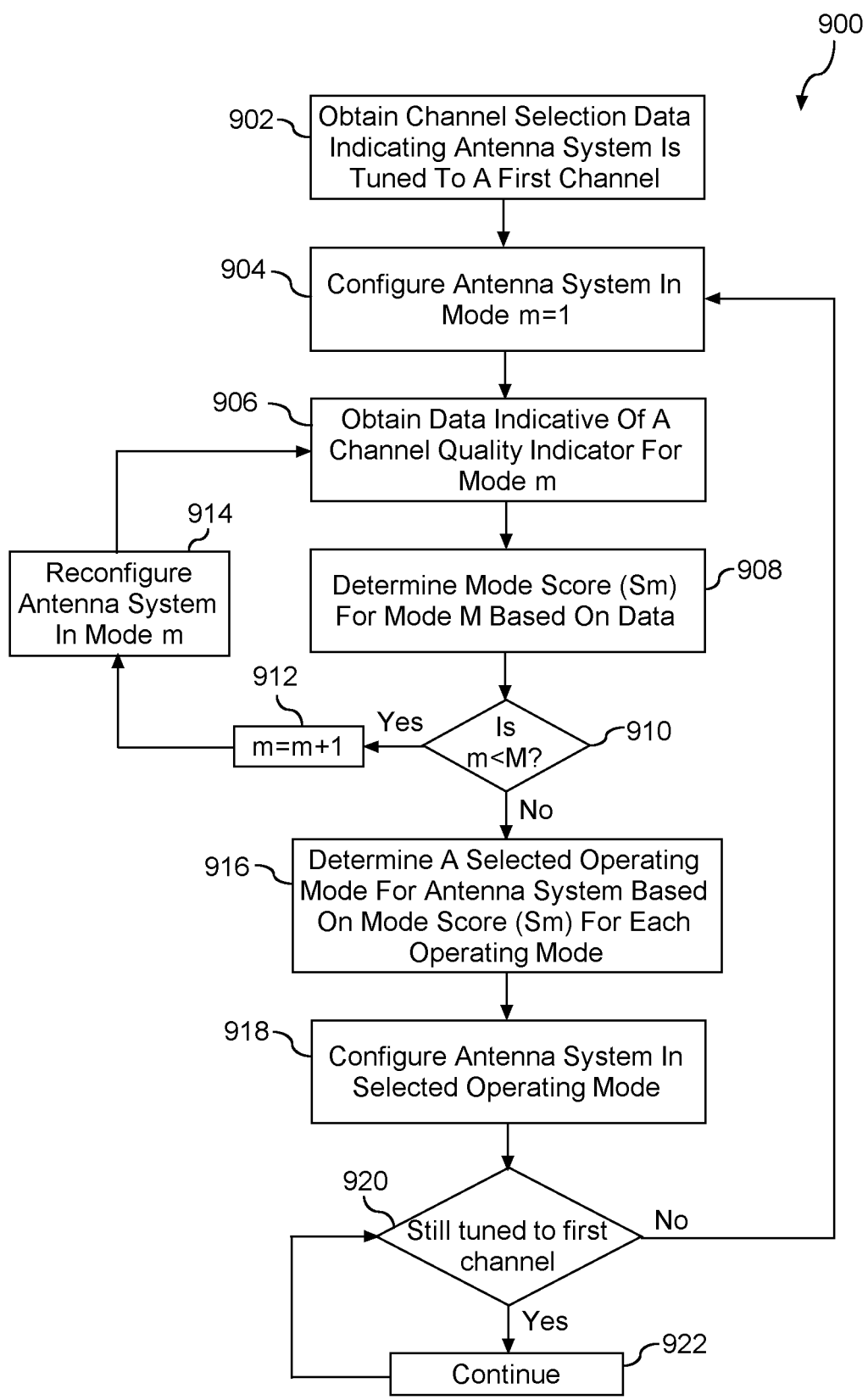
FIG. 9 depicts a flow diagram of a method for configuring a multi-mode antenna system according to example embodiments of the present disclosure.

Referring now to FIG. 9, a flow diagram of a method 900 for configuring a multi-mode antenna system is provided according to example embodiments of the present disclosure. It should be appreciated that the method 900 can be implemented by the controller 120 (FIG. 1) of the multi-mode antenna system 100 (FIG. 1). FIG. 9 depicts steps performed in a particular order for purposes of illustration and discussion. Those of ordinary skill in the art, using the disclosures provided herein, will understand that various steps of the method 900 may be adapted, modified, rearranged, performed simultaneously or modified in various ways without deviating from the scope of the present disclosure.

At (902), the method 900 includes obtaining channel selection data indicating the multi-mode antenna system is tuned to a first channel of a plurality of channels. Additionally, a channel counter variable, n, can be assigned a numerical value of 1. At (904), the method 900 includes configuring the multi-mode antenna system in one of a plurality of operating modes. Additionally, a mode counter variable, m, can be assigned a numerical value of 1.

At (906), the method 900 includes obtaining data indicative of a channel quality indicator for the current operating mode. For example, the data indicative of the CQI can include at least one of RSSI, SNR, SINR, MER, EVM, BER, BLER, and PER. After determining the CQI for mode m, the method 900 proceeds to (908).

At (908), the method 900 includes determining a mode score, $S_m$, for the current operating mode of the multi-mode antenna system. In example embodiments, the mode score $S_m$ can be determined as shown in the below Equation:

$$S_m = w_n \times CQI_{m,n} \qquad \text{Equation}$$

In the Equation, $w_n$ corresponds to the weighting factor assigned to channel n. Additionally, $CQI_{m,n}$ corresponds to the channel quality indicator for mode m when the multi-mode antenna system is tuned to channel n. After determining the mode score, $S_m$, for the current operating mode of the multi-mode antenna system, the method 900 proceeds to (910).

At (910), the method 900 includes determining whether the present value of the mode counter variable, m, is less than the total number of operating modes, M, of the antenna system. If the present value of the mode counter variable, m, is less than M, the method proceeds to (912). Otherwise, the method 900 proceeds (916).

At (912), the method 900 includes incrementing the mode counter variable, m. Once the mode counter variable has been incremented at (912), the method 900 proceeds to (914). At (914), the method 900 includes reconfiguring the multi-mode antenna system based, at least in part, on the present value of the mode counter variable, m. After reconfiguring the antenna system at (914), the method reverts to (906). It should be appreciated that, in some implementations, multiple iterations of steps (906), (908), (910), (912), and (914) may be performed until the present value of the mode counter variable, m, is equal to the total number of operating modes, M.

At (916), the method 900 includes determining a selected operating mode for the multi-mode antenna system for channel n based, at least in part, on the mode score (Sm) determined for each operating mode of the plurality of operating modes. In example embodiments, the selected operating mode can correspond to the operating mode having the highest mode score, Sm. After determining the selected operating mode for the multi-mode antenna system for channel n, the method 900 proceeds to (918).

At (918), the method 900 includes configuring the multi-mode antenna to operate in a selected operating mode. In some implementations, the selected operating mode can correspond to the operating mode (e.g., 1 through M) with the highest mode score ($S_m$) determined at (906). Once the multi-mode antenna is configured in the selected operating mode, the method proceeds to (920).

At (920), the method 900 includes determining whether the multi-mode antenna system is still tuned to the first channel. If the multi-mode antenna system is no longer tuned to the first channel, the method 900 proceeds to 902. If, however, the multi-mode antenna system is still tuned to the first channel, the multi-mode antenna system remains in the selected operating mode and the method 900 proceeds to (922). At (922), the method 900 includes entering a standby mode for a predetermined amount of time. When the predetermined amount of time lapses, the method 900 can revert to (920) to determine whether the multi-mode antenna system is still tuned to the first channel.

Figure 10:
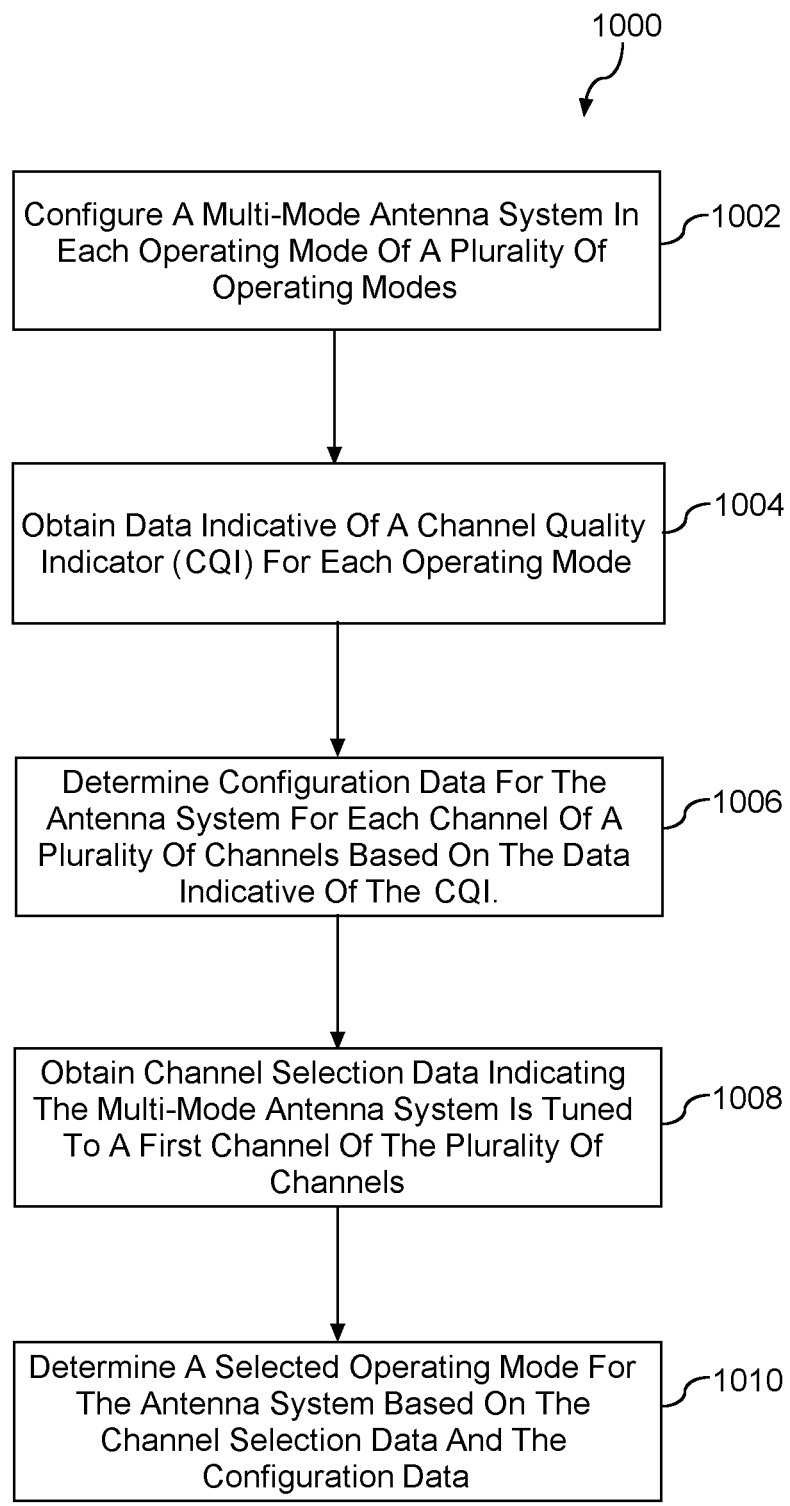
FIG. 10 depicts a flow diagram of a method for configuring a multi-mode antenna system according to example embodiments of the present disclosure.

Referring now to FIG. 10, a flow diagram of a method 1000 for configuring a multi-mode antenna system is provided according to example embodiments of the present disclosure. It should be appreciated that the method 1000 can be implemented by the controller 120 (FIG. 1) of the multi-mode antenna system 100 (FIG. 1). FIG. 10 depicts steps performed in a particular order for purposes of illustration and discussion. Those of ordinary skill in the art, using the disclosures provided herein, will understand that various steps of the method 1000 may be adapted, modified, rearranged, performed simultaneously or modified in various ways without deviating from the scope of the present disclosure.

At (1002), the method 1000 includes configuring the multi-mode antenna system in each operating mode of a plurality of operating modes. In example embodiments, each operating mode of the plurality of operating modes can have a distinct radiation pattern. At (1004), the method 1000 includes obtaining data indicative of a CQI for each operating mode. In example embodiments, the data indicative of the CQI can include at least one of RSSI, SNR, SNIR, MER, EVM, BER, BLER, and PER.

At (1006), the method 1000 includes determining configuration data for the multi-mode antenna system for each channel of a plurality of channels based, at least in part, on the data indicative of the CQI for each operating mode. As illustrated in the below Table, the configuration data can link each channel of the plurality of channels with one of the plurality of operating modes.

TABLE

Configuration Data for Multi-Mode Antenna System

| Channel | Operating Mode |
|---|---|
| 1 | First |
| 2 | First |

TABLE-continued

Configuration Data for Multi-Mode Antenna System

| Channel | Operating Mode |
|---|---|
| 3 | Second |
| 4 | Third |

In example embodiments, configuration data can include data indicative of the CQI for the selected operating mode. For instance, the configuration data for channel one shown in the above Table can include the data indicative of the CQI for the first operating mode. Additionally, the configuration data can include data indicative of the CQI for other operating modes (e.g., second, third, etc.) of the antenna system that were not selected as the operating mode for the antenna system when tuned to channel one.

At (1008), the method 1000 includes obtaining channel selection data indicating the multi-mode antenna system is tuned to a first channel of a plurality of channels. At (1010), the method 1000 includes determining a selected operating mode for the antenna system based, at least in part, on the channel selection data obtained at (1008) and the configuration data determined at (1006).

Figure 11:
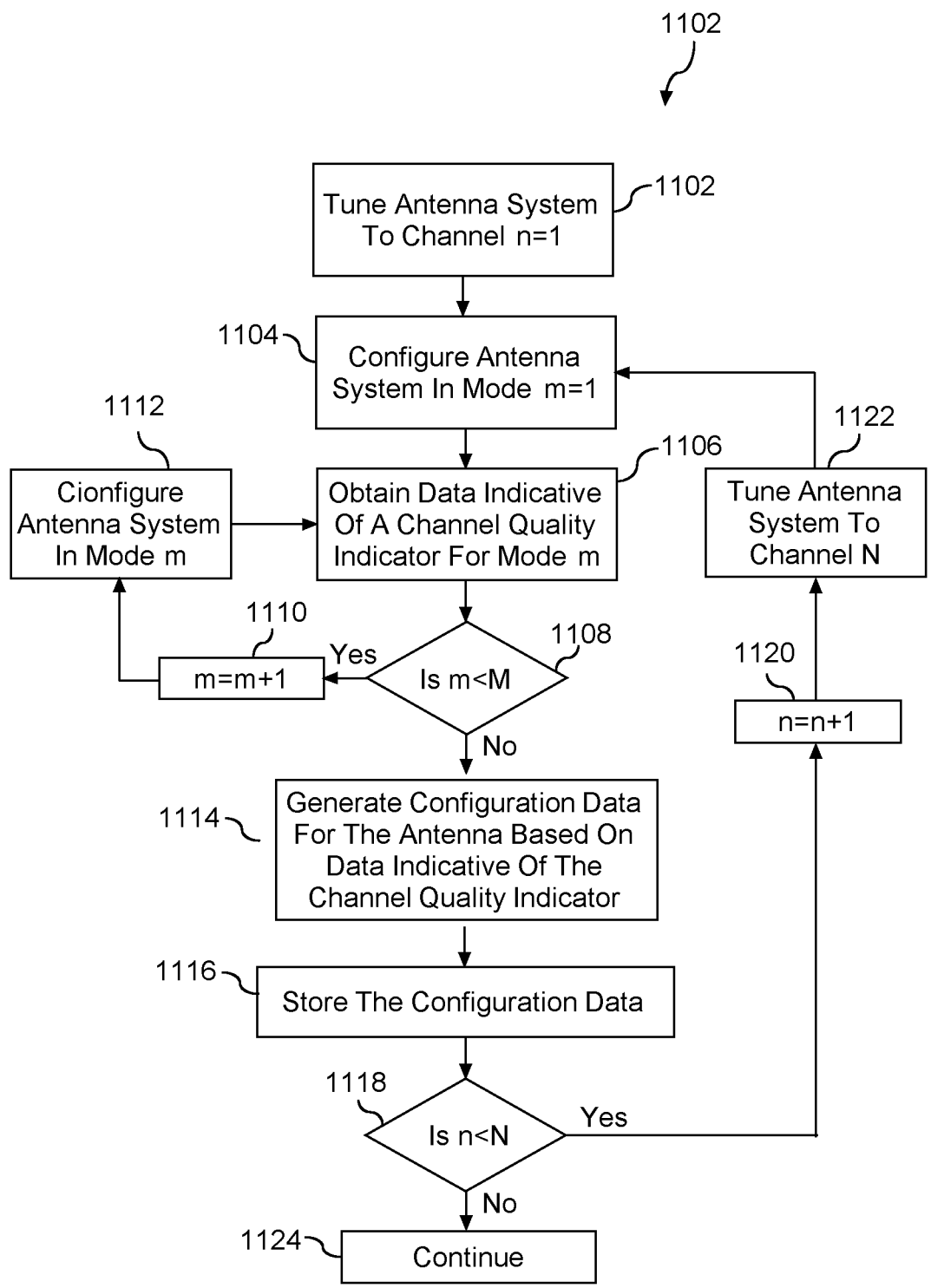
FIG. 11 depicts flow diagram of a method for configuring a multi-mode antenna system according to example embodiments of the present disclosure.

Referring now to FIG. 11, a flow diagram of a method 1100 for determining configuration data for a multi-mode antenna system is provided according to example embodiments of the present disclosure. It should be appreciated that the method 1100 can be implemented by the controller 120 (FIG. 1) of the multi-mode antenna system 100 (FIG. 1). FIG. 11 depicts steps performed in a particular order for purposes of illustration and discussion. Those of ordinary skill in the art, using the disclosures provided herein, will understand that various steps of the method 1100 may be adapted, modified, rearranged, performed simultaneously or modified in various ways without deviating from the scope of the present disclosure.

At (1102), the method 1100 includes tuning the multi-mode antenna system to a first channel of a plurality of frequency channels. Additionally, a channel counter variable, n, can be assigned a numerical value of 1. At (1104), the method 1100 includes configuring the multi-mode antenna system in one of a plurality of operating modes. Additionally, a mode counter variable, m, can be assigned a numerical value of 1.

At (1106), the method 1100 includes obtaining data indicative of a channel quality indicator (CQI) for mode m. In example embodiments, the data indicative of the CQI can include at least one of RSSI, SNR, SINR, MER, EVM, BER, BLER, and PER. After obtaining data indicative of the CQI for mode m, the method 1100 proceeds to (1108).

At (1108), the method 1100 includes determining whether the present value of the mode counter variable, m, is less than the total number of operating modes, M. If the present value of the mode counter variable, m, is less than M, the method 1100 proceeds to (1110). Otherwise, the method 1100 proceeds (1114).

At (1110), the method 1100 includes incrementing the mode counter variable, m. Once the mode counter variable has been incremented, the method 1100 proceeds to (1112). At (1112), the method 1100 includes reconfiguring the antenna system based, at least in part, on the present value of the mode counter variable, m. After reconfiguring the antenna system at (1112), the method 1100 reverts to (1106). It should be appreciated that, in some implementations, multiple iterations of steps (1106), (1108), (1110), and (1112) may be performed until the present value of the mode counter variable, m, is equal to the total number of operating modes, M.

At (1114), the method 1100 includes generating configuration data for the multi-mode antenna system based, at least in part, on the data obtained at (1106) for each operating mode of the plurality of operating modes. In example embodiments, the controller can compare the data obtained indicative of the CQI for each operating mode of the multi-mode antenna system to generate the configuration data. For example, if the data indicative of the CQI for a first operating mode of the multi-mode antenna system is better compared to data indicative of the CQI obtained for every other operating mode of the multi-mode antenna system, then the controller can generate configuration data linking channel n (e.g., the first channel) to the first operating mode of the multi-mode antenna. In this manner, the multi-mode antenna system can be configured in the first operating mode when tuned to the first channel of the plurality of channels.

At (1116), the method 1100 includes storing the configuration data. In example embodiments, configuration data can be stored in one or more memory devices (FIG. 12) associated with the controller of the antenna system. It should be appreciated, however, that the configuration data can be stored at any suitable location. Once the configuration data is stored, the method 1100 proceeds to (1118).

At (1118), the method 1100 includes comparing the present value of the channel counter variable, n, against a total number of channels, N. If the present value of the channel counter variable, n, is less than the total number of channels N, then the method 1100 proceeds to (1120). Otherwise, the method 1100 continues to (1124).

At (1120), the method 1100 includes incrementing the present value of the channel counter variable, n. After the channel counter variable, n, is incremented at (1120), the method 1100 proceeds to (1122). At (1122), the method 1100 includes tuning the multi-mode antenna system based, at least in part, on the present value of the channel counter variable, n. After tuning the multi-mode antenna system at (1122), the method 1100 reverts to (1104). It should be appreciated that multiple iterations of steps (1104) through (1122) may be performed until may be performed until the present value of the channel counter variable, n, is equal to the total number of channels, N.

At (1124), the method 1100 may continue. In example embodiments, the method 1100 may enter a wait period at (1124) until the channel selection data is obtained. During the wait period, the method 1100 may revert to (1102). In this manner, configuration data can be updated to account for various conditions (e.g. weather, interference, etc.) affecting performance of the multi-mode antenna system.

In some implementations, two or more sets of configuration data can be generated and/or updated at various portions of the day. For example, configuration data can include a first set of configuration data corresponding to a first portion of the day (e.g., morning), a second set of configuration data corresponding to a second portion of the day (e.g., afternoon), and a third set of configuration data corresponding to a third portion (e.g., evening) of the day.

In example embodiments, the controller can be configured to access one of the first set of configuration data, the second set of configuration data, and the third set of configuration data based, at least in part, on a time of day at which channel selection data is obtained. For instance, if channel selection data is obtained during the morning (e.g., between 6 AM and noon), the controller can be configured to determine a selected operating mode based, at least in part, on the channel selection data and the first set of configuration data. Alternatively, if the channel selection data is obtained during the afternoon (e.g., between noon and 5 PM), the controller can be configured to determine the selected operating mode based, at least in part, on the channel selection data and the second set of configuration data. Furthermore, if the channel selection data is obtained during the evening (e.g., between 5 PM and 6 AM), the controller can be configured to determine the selected operating mode based, at least in part, on the channel selection data and the third set of configuration data.

It should be appreciated that the first, second, and third set of configuration data may differ from one another. For instance, the first set of configuration data may link a first channel to a first operating mode. In contrast, the second set of configuration data may, due to weather conditions, indicate that a second operating mode of the antenna system is better than the first operating mode when the antenna system is tuned to the first channel. As such, the second set of configuration data may link the first channel with the second operating mode.

In some embodiments, the wait period at (1124) expires when the controller receives channel selection data indicating the antenna system is tuned to one of the plurality of channels. However, in some implementations, multiple iterations of steps (1102) through (1122) can be performed even after expiration of the wait period. More specifically, data indicative of the channel quality indicator for each of the operating modes can be obtained via one or more idle receiver (e.g., receivers not tuned to one of the plurality channels). For example, if the first receiver of the antenna system is tuned to one of the plurality of channels, the controller may continue to obtain data indicative of the channel quality indicator from a second receiver of the antenna system that is not currently tuned to one of the plurality of channels. In this manner, data indicative of the channel quality indicator for each operating mode can be reobtained and used to update the selected operating mode of the antenna system based on time-dependent changes (e.g., noise and interference) in the selected frequency channel.

Figure 12:
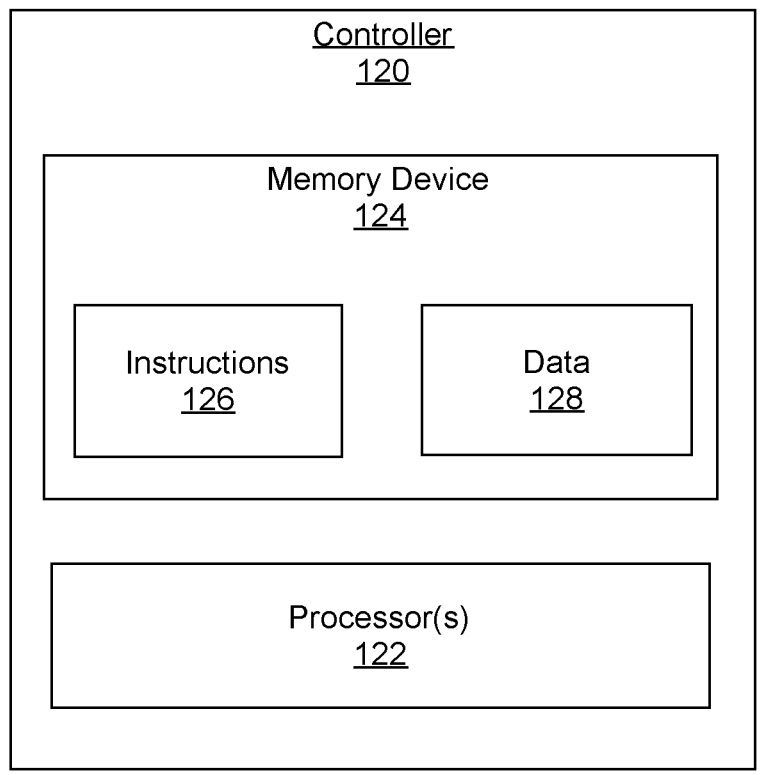
FIG. 12 depicts a block diagram of a controller of a multi-mode antenna system according to example embodiments of the present disclosure.

Referring now to FIG. 12, a block diagram of the controller 120 of the multi-mode antenna system 100 (FIG. 1) is provided according to example embodiments of the present disclosure. As shown, the controller 120 can include one or more processors 122 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

As shown, controller 120 can include a memory device 124. Examples of the memory device 124 can include computer-readable media including, but not limited to, non-transitory computer-readable media, such as RAM, ROM, hard drives, flash drives, or other suitable memory devices. The memory device 124 can store information accessible by the one or more processors 122, including computer-readable instructions 126 that can be executed by the one or more processors 122. The computer-readable instructions 126 can be any set of instructions that, when executed by the one or more processors 122, cause the processor(s) 722 to perform operations. The computer-readable instructions 126 can be software written in any suitable programming language or can be implemented in hardware. The memory device 124 may also store data accessible by the one or more processors 122, such as configuration data for the multi-mode antenna system 100 (FIG. 1).

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for configuring a multi-mode antenna system, the method comprising:
    obtaining, by a controller of the multi-mode antenna system, channel selection data indicating the multi-mode antenna system is tuned to a first channel of a plurality of channels;
    configuring, by the controller, a multi-mode antenna of the multi-mode antenna system in a first operating mode of a plurality of operating modes, each operating mode of the plurality of operating modes having a distinct radiation pattern;
    obtaining, by the controller, data indicative of a channel quality indicator for the first operating mode;
    determining, by the controller, whether the channel quality indicator for the first operating mode is greater than or equal to a threshold;
    responsive to determining the channel quality indicator for the first operating mode is greater than or equal to the threshold, determining, by the controller, whether the multi-mode antenna system is still tuned to the first channel; and
    responsive to determining the multi-mode antenna system is still tuned to the first channel. determining, by the controller, whether the channel quality indicator for the first operating mode is still greater than or equal to the threshold.

2. The method of claim 1, wherein the data indicative of the channel quality indicator comprises at least one of a signal to noise ratio (SNR), a signal-to-interference-plus-noise ratio (SINR), a magnitude error ratio (MER), an error vector magnitude (EVM), a bit error rate (BER), a block error rate (BLER), and a packet error rate (PER).

3. The method of claim 1, wherein the method further comprises:
    responsive to determining the channel quality indicator for the first operating mode is below the threshold, reconfiguring, by the controller, the multi-mode antenna in a second operating mode of the plurality of operating modes.

4. The method of claim 1, wherein the method further comprises:
    responsive to determining the channel quality indicator for the first operating mode is no longer above the threshold or equal to the threshold, reconfiguring, by the controller, the multi-mode antenna in a second operating mode of the plurality of operating modes;
    obtaining, by the controller, data indicative of a channel quality indicator for the second operating mode:
    determining, by the controller, whether the channel quality indicator for the second operating mode is greater than or equal to the threshold; and
    responsive to determining the channel quality indicator for the second operating mode is greater than or equal to the threshold, determining, by the controller. whether the multi- mode antenna system is still tuned to the first channel; and
    responsive to determining the multi-mode antenna system is still tuned to the first channel. determining, by the controller, whether the channel quality indicator for the second operating mode is still greater than or equal to the threshold.

5. The method of claim wherein the plurality of channels comprise a plurality of television channels.

6. A method for configuring a multi-mode antenna system, the method comprising:
    configuring, by a controlller, a multi-mode antenna of a multi-mode antenna system in each operating mode of a plurality of operating modes while the multi-mode antenna system is tuned to each of a plurality of channels. each of the plurality of operating modes having a distinct radiation pattern;
    obtaining, by the controller, data indicative of a channel quality indicator for each operating mode for each of the plurality of channels:
    generating, by the controller, configuration data for the multi-mode antenna for each channel of the plurality of channels based, at least in part, on the data indicative of the channel quality indicator, the configuration data linking each channel of the plurality of channels to a corresponding operating mode of the plurality of operating modes;
    storing, by the controller, the configuration data for the multi-mode antenna;
    obtaining, by the controller, channel selection data indicating the multi-mode antenna system is tuned to a first channel of the plurality of channels;
    determining, by the controller, a selected operating mode for the multi-mode antenna for the first channel based, at least in part, on the channel selection data and the configuration data; and
    configuring, by the controller, the multi-mode antenna in the selected operating mode,
    wherein the configuration data comprises at least a first set of configuration data and a second set of configuration data, the first set of configuration data linking each of the plurality of channels to a corresponding operating mode of the plurality of operating modes during a first portion of a day. the second set of configuration data linking each of the plurality of channels to a corresponding operating mode of the plurality of operating modes during a second portion of the day, the second portion of the day being different than the first portion of the day.

7. The method of claim 6, further comprising updating, by the controller, the configuration data for the multi-mode antenna system.

8. The method of claim 7, wherein updating the configuration data precedes obtaining channel selection data indicating the multi-mode antenna system is tuned to a first channel of the plurality of channels.

9. The method of claim 7, wherein updating the configuration data occurs while the multi-mode antenna system is tuned to the first channel of the plurality of channels.

10. The method of claim 6, wherein:
the first set of configuration data links the first channel to a first operating mode of the plurality of operating modes; and
the second set of configuration data links the first channel to a second operating mode of the plurality of operating modes.

11. The method of claim 6, further comprising updating, by the controller, the first set of configuration data and the second set of configuration data.

12. The method of claim 6, wherein:
the first portion of the day comprises daytime; and
the second portion of the day comprises nighttime.

13. The method of claim 6, wherein the configuration data further comprises a third set of configuration data, the third set of configuration data linking each of the plurality of channels to a corresponding operating mode of the plurality of operating modes during a third portion of the day.

14. The method of claim 13, wherein:
the first portion of the day comprises morning;
the second portion of the day comprises afternoon; and
the third portion of the day comprises evening.

15. A multi-mode antenna system, comprising:
a modal antenna configurable in a plurality of operating modes, each of the plurality of operating modes having a distinct radiation pattern;
at least two receivers; and
a controller configured to perform operations, the operations comprising:
configuring the modal antenna in each operating mode of a plurality of operating modes while a first receiver of the at least two receivers is tuned to each of a plurality of channels;
obtaining data indicative of a channel quality indicator for each operating mode for each of the plurality of channels;
generating configuration data for the modal antenna for each channel of the plurality of channels based, at least in part, on the data indicative of the channel quality indicator, the configuration data linking each channel of the plurality of channels to a corresponding operating mode of the plurality of operating modes;
storing the configuration data for the modal antenna.
obtaining channel selection data indicating a the first receiver of the at least two receivers is tuned to a first channel of the plurality of channels;
determining a selected operating mode for the multi-mode antenna for the first channel based, at least in part, on the channel selection data and the configuration data; and
configuring the modal antenna system in the selected operating mode,
wherein the configuration data comprises at least a first set of configuration data and a second set of configuration data, the first set of configuration data linking each of the plurality of channels to a corresponding operating mode of the plurality of operating modes during a first portion of a day, the second set of configuration data linking each of the plurality of channels to a corresponding operating mode of the plurality of operating modes during a second portion of the day, the second portion of the day being different than the first portion of the day.

* * * * *